Jan. 6, 1931.    A. W. POPE, JR    1,787,760
INTERNAL COMBUSTION ENGINE
Filed Nov. 10, 1927

Inventor
Arthur W. Pope, Jr.
By Brown, Boettcher and Dienner
Atty's

Patented Jan. 6, 1931

1,787,760

UNITED STATES PATENT OFFICE

ARTHUR W. POPE, JR., OF WAUKESHA, WISCONSIN, ASSIGNOR TO WAUKESHA MOTOR COMPANY, OF WAUKESHA, WISCONSIN, A CORPORATION OF WISCONSIN

INTERNAL-COMBUSTION ENGINE

Application filed November 10, 1927. Serial No. 232,383.

My invention relates to internal combustion engines and particularly to their combustion chambers and the immediate appurtenances thereof, to the end of numerous advantages in construction, operation and results.

Figure 2:
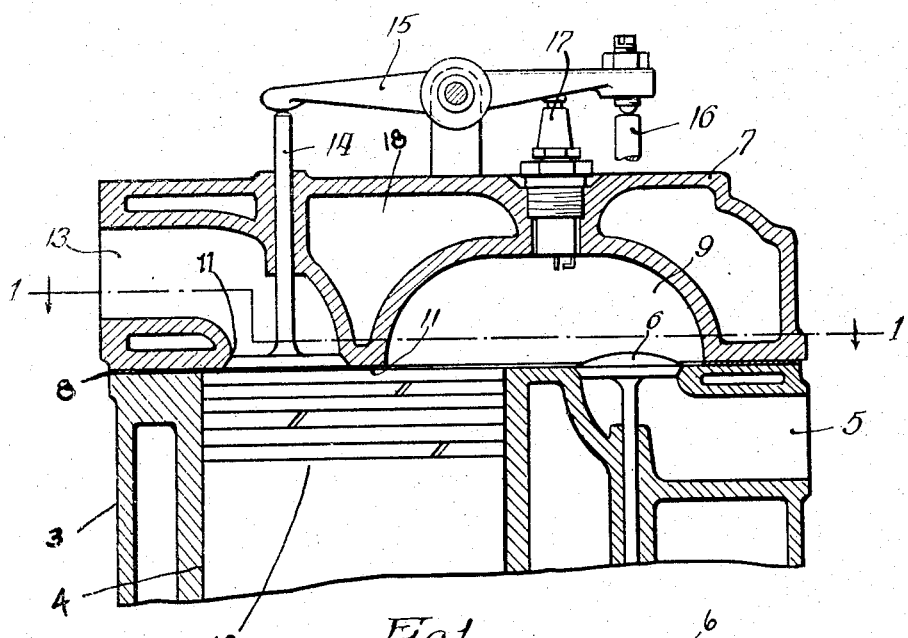
Figure 1:
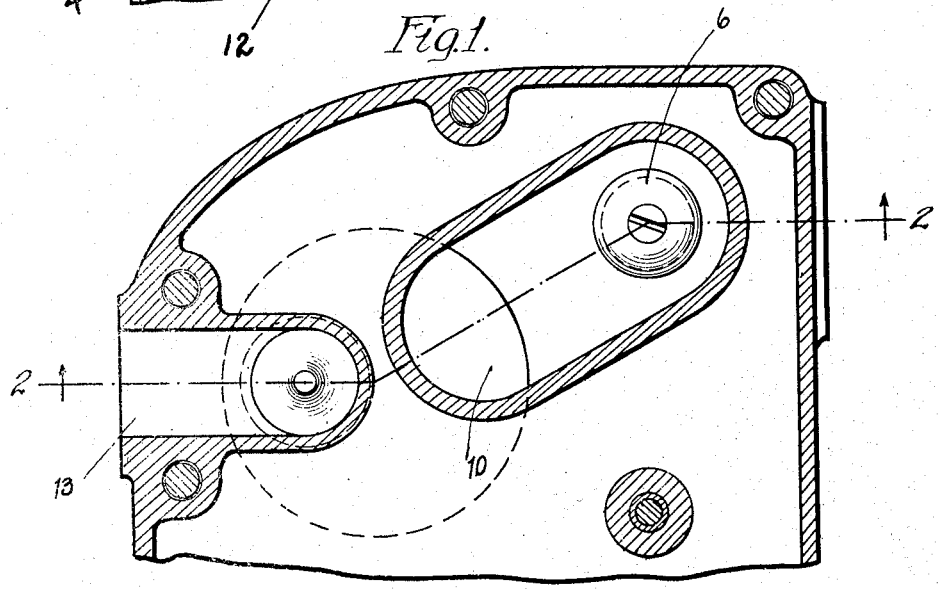

In the accompanying drawings,

Figure 1 is a horizontal sectional view of the engine of my invention taken on the plane of the line 1—1 of Figure 2; and Figure 2 is a vertical sectional view thereof taken on the plane of the line 2—2 of Figure 1.

The block 3 provides the cylinder 4, open at the top, and the exhaust 5 in lateral relation thereto and terminating in the top of the block as the cylinder does. The exhaust valve, which opens upwardly, is shown at 6.

The head 7, suitably secured upon the top of the block, with the gasket 8 intervening, is so formed as to provide a pocket 9 overlying the exhaust valve 6 and a portion of the cylinder, as shown. That portion of the underside of the head 7, other than the throat 10 which affords communication between the the pocket 9 and the cylinder 4, lies close to the top of the cylinder as indicated at 11. The piston 12, which reciprocates in the cylinder 4, is so arranged that in its uppermost position it comes close to the portion 11 of the head, the purpose being to confine the gases substantially entirely to the pocket 9 when the piston is at the top of its stroke.

The intake passageway is formed in the head, as indicated at 13, being so disposed as to terminate in the portion 11 thereof, as shown. The intake valve, which opens downwardly, is shown at 14, being operated by a rocker-arm 15 engaging with the end of its stem and operated, in turn, by the push rod 16 which is actuated by the cam shaft (not shown).

The spark plug is provided as shown at 17. The head, as a whole, is cored out where feasible, as indicated at 18, for the circulation of the cooling medium, the same being true of the cylinder.

By virtue of the construction described, a compact turbulence-producing combustion chamber is secured, the gases entrapped below the portion 11 of the head, when the piston is in its uppermost position, being negligible. The intake valve 14 may be made large, and given a high lift, in order to meet demands, and this without increasing engine length or interfering with complete water jacketing of its seat. Due to the fact that it is feasible to use a relatively small exhaust valve, the distance between cylinder center and exhaust valve center, which affects the engine width and combustion chamber compactness, may be kept small, without affecting the size of the intake valve. The direct intake into the cylinder increases volumetric efficiency. The above features enable the use of high compression ratios.

I claim:—

1. In an internal combustion engine, a cylinder, a piston reciprocating in said cylinder, an exhaust passage lying alongside said cylinder, a head having a pocket overlying said exhaust and part of said cylinder on one side of the center thereof and having a portion lying over and close to the remainder of the cylinder area, an intake passage in said head terminating in said last-named portion thereof wholly on the other side of the center of said cylinder, valves for said passages, and ignition means in said pocket.

2. In an internal combustion engine, a cylinder, a piston reciprocating in said cylinder, an exhaust passage lying alongside said cylinder, a head having a pocket overlying said exhaust and part of said cylinder on one side of the center thereof and having a portion lying over and close to the remainder of the cylinder area, said pocket representing all of the effective combustion space when the piston is in the position of greatest compression, an intake passage in said head terminating in said last-named portion thereof wholly on the other side of the center of said cylinder, valves for said passages, and ignition means in said pocket.

3. In an internal combustion engine, a cylinder, a piston reciprocating in said cylinder, an exhaust passage lying alongside said cylinder, a head having a pocket overlying said exhaust and part of said cylinder and having a portion lying over and close to the remainder of the cylinder area, an intake passage in said head terminating in said last named portion thereof, valves for said passages, and ignition means in said pocket.

4. In an internal combustion engine, a cylinder, a piston reciprocating in said cylinder, a combustion chamber adjoining and communicating restrictedly with the end of said cylinder on one side of the center thereof, said combustion chamber representing all of the effective combustion space when the piston is in the position of greatest compression, a burned gas outlet passage for said combustion chamber, said combustion chamber being otherwise closed, and a combustible gas inlet passage directly for said cylinder communicating therewith wholly on the other side of the center thereof, said cylinder being otherwise closed, valves for said passages, and spark ignition means within said combustion chamber.

In witness whereof, I hereunto subscribe my name this 9th day of November, 1927.

ARTHUR W. POPE, Jr.